US009766066B2

(12) United States Patent
Gotsmann et al.

(10) Patent No.: US 9,766,066 B2
(45) Date of Patent: Sep. 19, 2017

(54) POSITION SENSING APPARATUS

(71) Applicant: INTERNATIONAL BUSINESS MACHINES CORPORATION, Armonk, NY (US)

(72) Inventors: Bernd W. Gotsmann, Horgen (CH); Emanuel Loertscher, Bonstetten (CH)

(73) Assignee: GLOBALFOUNDRIES INC., Grand Cayman (KY)

( * ) Notice: Subject to any disclaimer, the term of this patent is extended or adjusted under 35 U.S.C. 154(b) by 393 days.

(21) Appl. No.: 14/381,963

(22) PCT Filed: Feb. 15, 2013

(86) PCT No.: PCT/IB2013/051239
§ 371 (c)(1),
(2) Date: Aug. 28, 2014

(87) PCT Pub. No.: WO2013/128321
PCT Pub. Date: Sep. 6, 2013

(65) Prior Publication Data
US 2015/0077359 A1 Mar. 19, 2015

(30) Foreign Application Priority Data

Feb. 29, 2012 (GB) .................................. 1203511.9

(51) Int. Cl.
*G01B 7/14* (2006.01)
*G01B 21/16* (2006.01)
(Continued)

(52) U.S. Cl.
CPC .............. *G01B 21/16* (2013.01); *G01L 1/205* (2013.01); *G06F 3/041* (2013.01);
(Continued)

(58) Field of Classification Search
CPC .......... G01N 29/022; G01N 2011/0066; G01L 1/205; G06F 3/041; G06F 3/044;
(Continued)

(56) References Cited

U.S. PATENT DOCUMENTS 5,268,584 A * 12/1993 Dowell .............. C09K 19/3823
252/299.01
5,538,655 A * 7/1996 Fauteux .............. C08B 37/0012
252/62.2
(Continued)

FOREIGN PATENT DOCUMENTS

CN 101734645 A 6/2010
CN 101852935 A 10/2010
(Continued)

OTHER PUBLICATIONS

International Search Report Dated Jul. 18, 2013. PCT/IB2013/051239.
(Continued)

*Primary Examiner* — Bryan Earles
(74) *Attorney, Agent, or Firm* — Scully Scott Murphy and Presser

(57) ABSTRACT

A sensor apparatus is provided for sensing relative position of two objects. First and second molecular components, each comprising at least one electronic system, are connected to respective objects. The molecular components are arranged in mutual proximity such that an interaction between the electronic systems of respective components varies with relative position of the objects, the interaction affecting an electrical or optical property of the components. A detector detects the property to produce an output dependent on relative position of the objects.

15 Claims, 9 Drawing Sheets

(51) Int. Cl.
*G06F 3/041* (2006.01)
*G01L 1/20* (2006.01)

(52) U.S. Cl.
CPC .............. *G06F 2203/04102* (2013.01); *G06F 2203/04103* (2013.01); *G06F 2203/04105* (2013.01)

(58) Field of Classification Search
CPC ........... G06F 3/045; G06F 2203/04103; G06F 2203/04102; G06F 2203/04105; G01B 21/16; B81B 3/0018; B81C 1/0015; B81C 1/00198
USPC ............. 427/301, 457; 356/32, 34, 35.5, 72; 338/47; 345/905
See application file for complete search history.

(56) References Cited

U.S. PATENT DOCUMENTS

| | | | | |
|---|---|---|---|---|
| 6,031,756 A * | 2/2000 | Gimzewski | ............ | B82Y 10/00 365/151 |
| 7,166,327 B2 * | 1/2007 | Afzali-Ardakani | .... | B05D 1/185 427/301 |
| 7,582,897 B2 * | 9/2009 | Hirai | ............ | B82Y 10/00 257/290 |
| 7,741,197 B1 * | 6/2010 | Duan | ............ | B82Y 30/00 438/478 |
| 8,018,563 B2 * | 9/2011 | Jones | ............ | B82Y 10/00 252/500 |
| 9,024,297 B2 * | 5/2015 | McCreery | ............ | H01L 51/0504 257/26 |
| 2003/0107927 A1 * | 6/2003 | Yerushalmi | ............ | F16F 1/00 365/200 |
| 2006/0081838 A1 * | 4/2006 | Matsui | ............ | B82Y 10/00 257/40 |
| 2006/0099808 A1 * | 5/2006 | Kondo | ............ | F16F 9/532 438/674 |
| 2010/0052701 A1 * | 3/2010 | Shim | ............ | B82Y 15/00 324/662 |
| 2010/0317409 A1 * | 12/2010 | Jiang | ............ | G06F 1/1626 455/566 |
| 2013/0010244 A1 * | 1/2013 | Suwa | ............ | G02F 1/133788 349/123 |
| 2013/0320467 A1 * | 12/2013 | Buchanan | ............ | G01N 29/022 257/419 |

FOREIGN PATENT DOCUMENTS

| | | |
|---|---|---|
| CN | 101930305 A | 12/2010 |
| DE | 102004013305 A1 | 9/2005 |
| WO | 2013128321 A2 | 6/2013 |

OTHER PUBLICATIONS

International Search Report Dated Jul. 18, 2013. PCT/IB2013/051239 Written Opinion.
Aljohm, Abdulkareem et al.; "Transaction-Centric Mobile-Payment classification model"; 2013 Seventh International Conference on Next Generation Mobile Apps, Services and Technologies; Copyrightt 2013 IEEE; pp. 68-74.

* cited by examiner n = 0,1,2,3,4

POSITION SENSING APPARATUS

CROSS-REFERENCE TO RELATED APPLICATIONS

This application is, under 35 U.S.C 371, a U.S. National Stage entry of International Application No. PCT/IB2013/051239 filed on Feb. 15, 2013, which is published under PCT Article 21(2) and which claims priority of Great Britain Patent Application No. 1203511.9 filed on Feb. 29, 2012.

TECHNICAL FIELD OF THE INVENTION

This invention relates to position sensing apparatus, and more particularly to apparatus for sensing relative position of objects based on interaction between molecular components.

BACKGROUND

Many applications require precise sensing of the position of one object with respect to another. Prominent applications include touch screens, accelerometers, strain gauges and various other applications in metrology. Typically in these applications, the electrical capacitance between two movable electrodes is measured and used to determine the electrode spacing. Optical methods, e.g. laser interferometers, require large optics and sophisticated control functions. Other methods exist but these are typically less sensitive or achieve sensitivity only in combination with large form factors. Resistive strain gauges, for instance, require large displacements to achieve the required resolution, rendering them unsuitable as probes for highly localized measurement. Other, more sensitive sensors such as those based on the piezo-resistive effect require a significant electronics overhead. Such sensors are also relatively expensive and do not meet the requirements of all applications. For example, in touch screen applications there is a requirement for transparency, and possibly also flexibility of the screen.

With conventional sensors having the required sensitivity, the individual sensors cannot easily be integrated into existing micro-electronics components due to their large form factors. Capacitive position sensing in particular does not scale well towards larger integration densities. Use of conventional techniques is therefore problematical if extremely sensitive measurement and/or extreme miniaturization is required.

German Patent Application No. DE102004013305A1 discloses a sensor layer in which electrically conductive atomic or molecular clusters are embedded in a matrix of insulating or poorly conductive material. Conductivity of the layer due to electron tunneling between clusters varies with changing inter-cluster distances caused by strain.

"Molecular Junctions based on Aromatic coupling", Wu et al., Nature Nanotech., 2009, Vol. 3, Pages 569-574, proposes as a plausible formation mechanism of a molecular junction the effect of π-π stacking of molecules at the ends of two gold electrodes formed by rupture of a gold wire.

SUMMARY

According to an embodiment of an aspect of the invention there is provided a sensor apparatus for sensing relative position of two objects. The apparatus comprises:

first and second molecular components each comprising at least one electronic system, the components being connected to respective objects and arranged in mutual proximity such that an interaction between the electronic systems of respective components varies with relative position of the objects, the interaction affecting an electrical or optical property of the components; and a detector for detecting the property to produce an output dependent on relative position of the objects.

DETAILED DESCRIPTION

Figure 1:
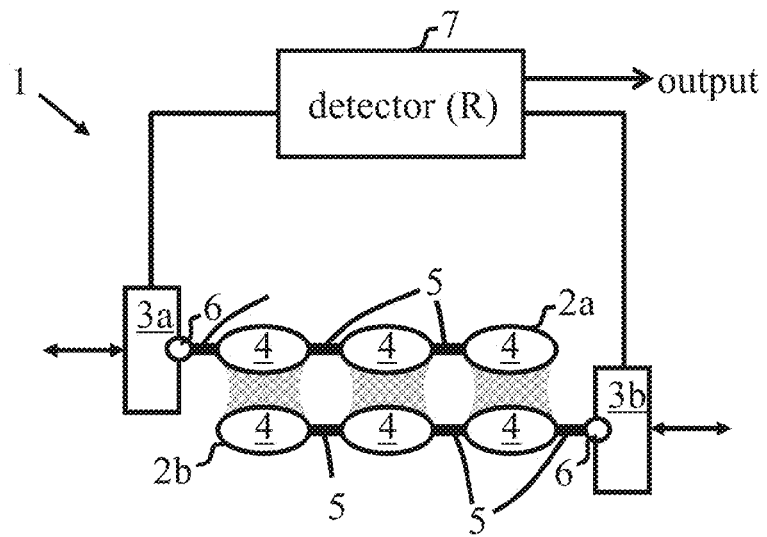
FIG. 1 is a schematic representation of first sensor apparatus embodying the invention.

In embodiments of this invention, relative position of two objects is sensed via the interaction between distinct electronic systems of molecular components attached to respective objects. This interaction affects an electrical and/or optical property of the interacting components and varies with relative position of the objects, whereby detection of the aforementioned property provides information on relative position. Each molecular component may be a molecule in its own right or may comprise one or more molecules, and/or atoms/ions with one or more additional constituent parts. An electronic system of a component may in general comprise any system involving electrons such as an atom, ion, molecule or part thereof. Electronic systems may in particular comprise free electron systems around atomic sites. In any case, by using such an arrangement of molecular components and exploiting the interaction between electronic systems of the components, embodiments of the invention may provide extremely sensitive positional measurements. Angstrom resolution and sensitivity to sub-molecular distances may be readily achievable. Very little electronics may be required for detection, obviating the overhead associated with conventional systems. The apparatus can also be made transparent and may thus offer a simple and practicable solution for touch screen applications. Furthermore, embodiments of the invention may permit ultimate miniaturization, high-density integration and cheap mass-fabrication.

In general in embodiments of the invention, the detector may detect the aforementioned property directly or indirectly (to detect change in interaction between the molecular components) e.g. by detecting some parameter dependent thereon. The detector output may depend in a variety of ways on relative position of the objects, e.g. via electrical, chemical or optical interaction between the components. The output may, for instance, indicate object spacing or simply a change in relative position due to relative displacement (linear and/or angular) of the objects. In preferred embodiments discussed below the detector output can provide absolute positional information for the objects. Such an object may comprise a distinct component of a device or part of a larger component such as a localized region of a flexible touch screen. It will be appreciated, of course, that relative position of the objects may be sensed as a metric for numerous related physical quantities or effects, such as strain, pressure, acceleration, etc., as well as positional information per se, depending on the particular application in question.

In preferred embodiments, at least one, and most preferably both, of the molecular components comprises a plurality of electronic systems. The interaction between components can then be extended spatially, with the interaction, and hence detected property, varying with relative movement over the extent of more than one system. In molecular components comprising a plurality of electronic systems, adjacent systems are preferably interconnected and electrically coupled by a spacer for spatially separating and supporting the systems. The spacer may, for example, comprise a chemical bond or may comprise one or more atoms, ions or molecules in its own right. The spacer provides support to give the component a required degree of rigidity for mechanical operation, while allowing the interaction range to be further extended spatially. The degree of electrical coupling via the spacer can vary as discussed below. In general, a spacer may be a good or a poor conductor while providing a least some minimum level of coupling as required for the detection mechanism.

Advantageously, the arrangement is such that the discrete structure of one or both molecular components due to use of spacers is reflected in the variable interaction and hence detected property. In particular, molecular components can be constructed and arranged such that different groups of the electronic systems of respective components interact at different relative positions of the objects causing step-like changes in the property with relative position of the objects. The arrangement thus provides discrete interaction sites in operation leading to discrete signals on detection. The detector can be adapted to detect such discrete, step-like changes to produce the output. In this case the detector output can provide more accurate positional information than the effective spacing of the interaction systems given by the spacers, including absolute position information. This is discussed in more detail below.

In some embodiments the spacer(s) may be adapted to permit electronic conjugation of adjacent electronic systems, whereby electrons, holes or ions can move freely between the systems. However, in order to achieve or enhance the aforementioned step-like changes in the detected property, in some embodiments the spacer(s) may be adapted to inhibit electronic conjugation of the adjacent systems. The spacer may therefore be a poor electrical conductor in this case.

Numerous structures and arrangements for molecular components can be envisaged. Some preferred embodiments include one or more elongate components, e.g. comprising a linear array of electronic systems, the objects being relatively movable such that (at least a component of the) relative movement of the elongate molecular component is directed along its length. A particularly simple design employs (at least) two such elongate molecular components arranged laterally of one another. With such an arrangement, relative movement of the objects causes increasing/decreasing overlap of the side-by-side elongate components and the interaction between them varies accordingly. Such an arrangement may further include at least one molecular ring attached to one component and extending around the other component. The molecular ring here serves to constrain lateral spacing of the components, keeping the components at such a distance that interaction can take place. This may permit increased range of movement, e.g. beyond the interaction range of the two components as explained further below.

In embodiments where the molecular components comprise plural electronic systems, the systems of the first component may be arranged at a first pitch and the systems of the second component at a second, different pitch. Such a different inter-system spacing on the two components can be achieved by appropriate selection of the electronic systems and/or spacers in each case. This feature allows sub-pitch resolution to be achieved, e.g. in the manner of a Vernier scale, as discussed further below.

In another preferred design, at least one of the molecular components comprises a two-dimensional network of electronic systems. In a particular example here, both components comprise respective two-dimensional networks of like electronic systems with like network arrangements, the components being arranged in parallel with a rotational offset between the networks. The rotational offset here again permits sub-pitch resolution to be achieved as discussed below.

The interaction between molecular components may comprise at least one of an ionic exchange force, hydrogen bridge force, dipole force and Van der Waals force. The interaction may affect at least one of electrical resistance and optical absorption of the interacting components. Depending on the particular design, the interaction between molecular components may affect an electrical and/or an optical property of the components. Where both are effected, the detector may be adapted to detect each property to produce the output. This feature, discussed further below, can provide more efficient and/or accurate detection.

While two molecular components may be sufficient for some applications, other embodiments may include a plurality of pairs of the molecular components. The detector in such embodiments can be adapted to detect the aforementioned property of each pair of components to produce the output. A particular example here is a touch screen display having a flexible touch screen extending over a support structure, and a plurality of pairs of molecular components. Each pair of components is mounted between the support structure and a respective region of the touch screen such that the interaction between the pair of components varies in response to movement of that region of the screen caused by a user touching the screen.

Preferred embodiments of the invention will now be described, by way of example, with reference to the accompanying drawings.

The schematic of FIG. 1 shows the general structure of a first example of sensor apparatus embodying the invention. The apparatus 1 comprises first and second elongate molecular components 2a, 2b. The molecular components are respectively connected to contact regions, indicated schematically at 3a and 3b, of first and second objects (not shown further in the figure). The contacts 3a, 3b may be made of metal, semiconductor or other suitable material. These contacts may be provided on a variety of objects whose relative position is to be sensed, this relative position changing with e.g. mechanical motion, strain, pressure, thermal expansion, thermal shrinkage, etc., depending on the particular application of the sensor apparatus. Each molecular component 2a, 2b comprises a plurality of electronic systems (three being shown in this example) which are represented schematically by ovals 4. The electronic systems 4 of each component are arranged in a linear array and are interconnected by spacers 5 which collectively provide a supporting "backbone" for the component. The spacers 5 spatially separate and support the electronic systems 4 and provide for electrical coupling along the backbone as discussed further below. An end spacer of each component is connected to the respective contact 3a, 3b by an anchor, indicated schematically at 6, in this embodiment. Particular examples of electronic systems 4, spacers 5 and anchors 6 will be given below.

The elongate molecular components 2a, 2b are arranged laterally of one another, and substantially in parallel as shown, such that relative movement of objects 3a, 3b effects relative movement of each component in a direction along its length as indicated by the arrows in the figure. The components are thus relatively movable along substantially parallel directions aligned with the longitudinal axes of their backbones. The mutual proximity of the components 2a, 2b is such that the electronic systems 4 of respective components interact with one another. This interaction is indicated schematically by the shaded areas in the figure. In this first embodiment we consider electronic coupling as the basis for the interaction. A particular example here is the interaction of stacked π systems (delocalized electron systems) of phenyl (aryl, or benzene) rings as explained below. Due to proximity of the molecular components 2a, 2b, electronic systems 4 on respective components are in electronic contact with one another in such a way that the bonds formed between them are not chemical. Instead, the electronic states of the individual systems interact. The electronic conjugations of the systems 4 are altered by this interaction, leading to an electronic cross-talk/communication interaction between the electronic systems referred to as π-π stacking.

The interaction between the molecular components 2a, 2b varies with their relative position. Moreover, this variable intermolecular coupling affects an electrical property of the interacting components. The apparatus 1 includes a detector 7 for detecting this electrical property to produce an output dependent on relative position of the objects 3a, 3b. In this example, detector 7 detects electrical resistance (R) and may be implemented using a current (or voltage) meter for measuring current flowing through (or voltage dropped across) components 2a, 2b between contacts 3a, 3b on application of a known constant voltage (or current as appropriate). An output of detector 7 is based on the resistance metric so detected. The detector output thus depends on relative position of objects 3a, 3b. In a simple implementation, for example, the detector 7 may simply output the measured current (or voltage) level as a metric for relative or absolute position.

Figure 2:
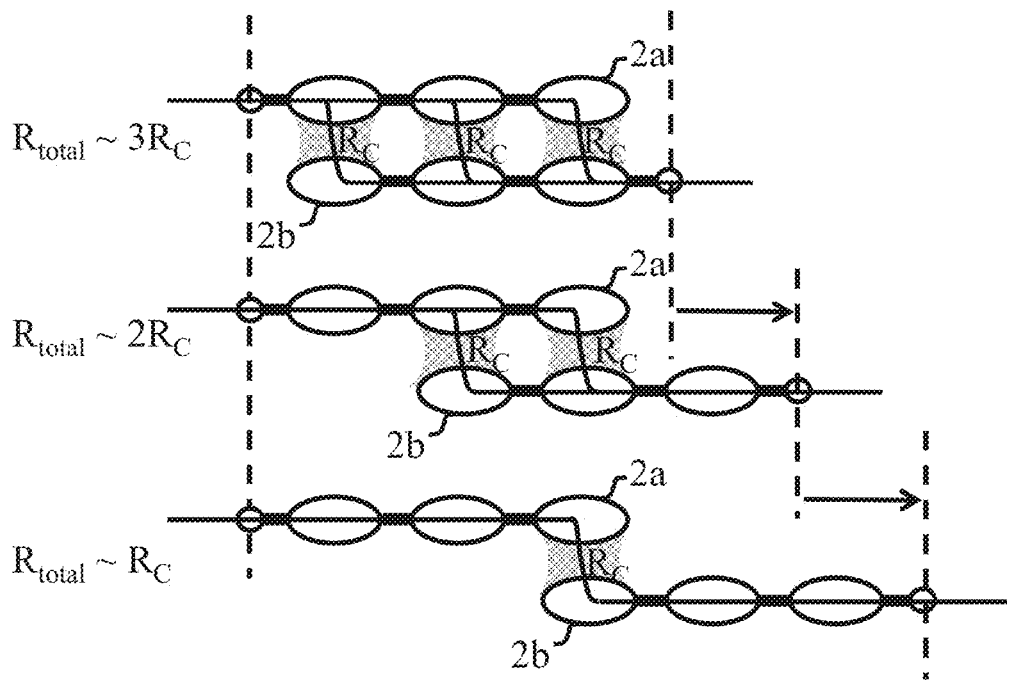
FIG. 2 illustrates operation of the embodiment of FIG. 1.

FIG. 2 illustrates the basic operating principles in more detail. As the spacing between anchor points 6 increases with relative movement of the objects, the degree of interaction between the collective systems 4 of respective components 2a, 2b varies in a distinct but also continuous way. In particular, as relative movement changes the overlap between components, different groups of the electronic systems 4 of respective components interact at different relative positions of the objects. This is shown in successive stages from top to bottom of FIG. 2. Here, varying electronic interactions between the components cause a corresponding variation in the resistance of the interacting components, and the current (or voltage) measured by detector 7 will be strongly modulated as a result. For example, the resistance $R_{total}$ decreases with increasing separation from approximately $3R_C$ in the upper arrangement of FIG. 2 to approximately $R_C$ in the lower arrangement, where $R_C$ is the cross-talk resistance (assumed to be larger than the resistance $R_{MOL}$ of an individual molecular component here).

In this embodiment, the spacers are selected to be relatively poor conductors in order to inhibit electronic conjugation of adjacent electronic systems 4. That is, adjacent systems 4 on each component do not hybridize and remain distinct/discrete, while the spacers still provide a level of conductivity necessary for the electrical detection mechanism. Due to the spatially and electrically distinct nature of the electronic systems 4 on each component, the measured resistance exhibits distinct steps on top of the underlying general trend as the components are moved. That is, in addition to a generally increasing/decreasing trend depending on direction of movement, the resistance exhibits more abrupt or step-like changes (compared to linear/steady change) due to distinct changes in the interaction occurring as the different groups of electronic systems 4 come into interaction at different stages of the movement. The step-like changes occur at discrete positions dependent on the particular structure of the molecular components. These step-like changes offer more precise positional information than would be obtainable if the monitored property were simply linearly or steadily-varying, without such distinct features. This is because absolute resistance values may be subject to drift, and so may not correlate reliably with absolute position. The step-like changes, in contrast, occur at known interaction positions determined by the particular design of components 2a, 2b. Hence, by identifying these features in the measured resistance $R_{total}$, absolute positional information can be obtained without the need for external calibration and drift compensation. In preferred implementations, therefore, detector 7 can include logic for identifying the step-like resistance changes and relating measured resistance values to these reference points to correct for drift and effectively provide a self-calibration function. Suitable detector logic, which may be implemented in hardware and/or software, will be readily apparent to those skilled in the art. If the detector is adapted to correlate the step-like resistance changes with predetermined positional measurements based on known component dimensions, measured resistance values can then converted to positional measurements to provide an output indicative of absolute position of one object with respect to the other (or to some predefined reference position).

Figure 3:
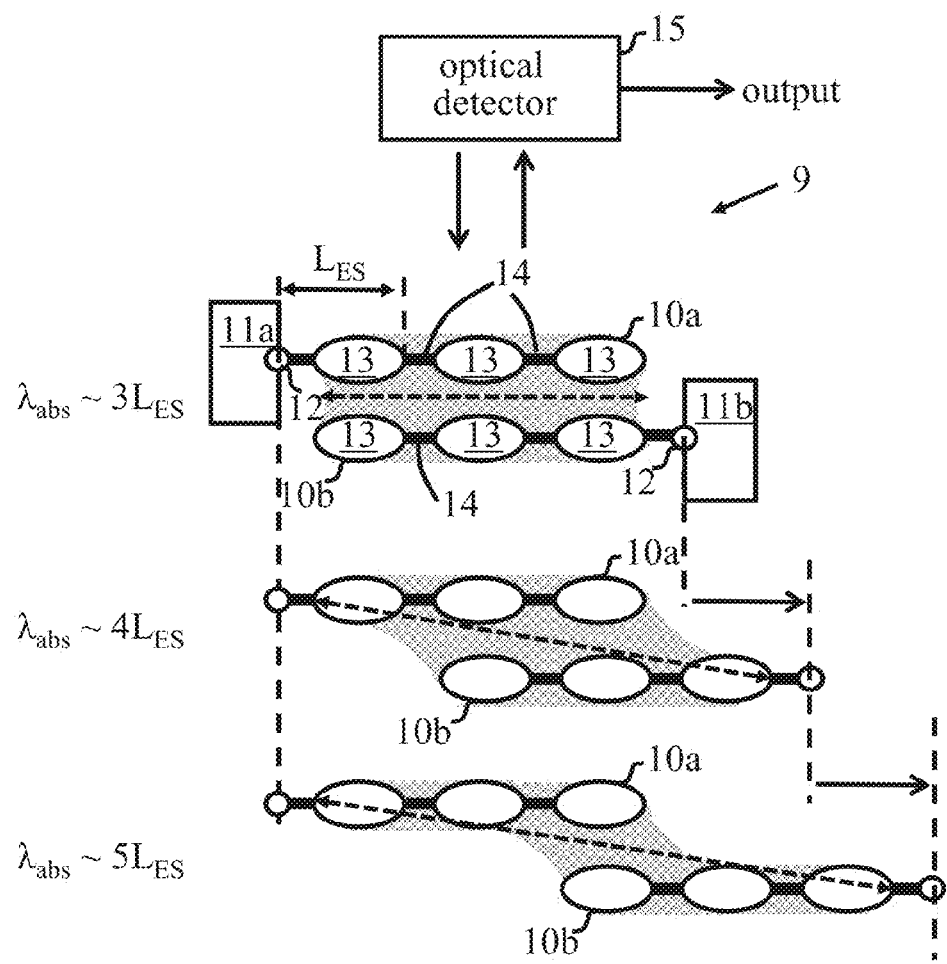
FIG. 3 illustrates operation of second sensor apparatus embodying the invention.

Although the spacers 5 are poor conductors in this embodiment to inhibit conjugation of adjacent systems 4, in general a spacer may be a good or a poor conductor while providing a least some minimum level of coupling as required for the detection mechanism e.g. to permit the variable property of the interacting components to be detected and/or to cause the property to be affected by the interaction. An embodiment employing highly-conductive spacers is illustrated in FIG. 3. The sensor apparatus 9 of this embodiment has a broadly similar structure to the apparatus of FIG. 1, employing elongate molecular components 10a, 10b connected to respective objects 11a, 11b by an anchor 12. Each molecular component 10a, 10b comprises a linear array of electronic systems 13 interconnected by spacers 14 providing a supporting backbone. In this embodiment, however, the spacers 14 are selected to be good conductors to permit conjugation of adjacent electronic systems 13. Hence, free electrons can essentially move freely between the electronic systems of each individual molecular component. In addition, the proximity of components 10a, 10b results in electronic cross-talk between the systems of the two components as described above. The resulting interaction due to electronic coupling is indicated schematically by the shaded region in the figure.

In this embodiment, the relative position of objects 11a, 11b is sensed by detecting optical absorption of the interacting molecular components. Light absorption of the entire conjugated system can be considered as a "particle-in-a-box" quantum mechanical problem, where the moving electrons can travel over the length of the conjugated system. This length (indicated by the dashed arrow in the figure) is approximately $3L_{ES}$ for the configuration at the top of FIG. 3, where $L_{BS}$ denotes the pitch of adjacent electronic systems 13. As indicated schematically in the figure, an optical detector 15 emits a spectrum of light wavelengths, which are incident on interacting components 10a, 10b, and detects the absorption wavelength $\lambda_{abs}$ of the system by identifying the missing wavelength in the spectrum transmitted by the system. The optical detector 15 can be implemented in generally known manner as will be readily apparent to those skilled in the art. Note that electrical conductivity of objects 11a, 11b is not required for this optical detection mechanism.

As the length of the conjugated system 10a, 10b changes when anchoring points 12 are moved further apart or closer together, the absorption wavelength detected for the system will change accordingly. This is indicated schematically in FIG. 3 for three successive stages of the relative movement. In the upper configuration, the absorption wavelength $\lambda_{abs}$ is approximately $3L_{ES}$. In the middle configuration, the absorption wavelength is approximately $4L_{ES}$. In the lower configuration, the absorption wavelength is approximately $5L_{ES}$. The output of detector 15 based on absorption wavelength $\lambda_{abs}$ thus varies in a substantially continuous manner with relative movement of objects 11, 11b.

As an alternative to optical detection, the electrical detection mechanism of FIG. 1 could be employed with the conjugated system of FIG. 3. In this case the measured resistance may vary approximately linearly with relative movement. However, depending on particular design, e.g. selection of appropriate spacers, the spatial separation between electronic systems may of itself result in identifiable step-like features in the measurements, and particular spacers and/or electronic systems may be selected to achieve this for the reasons discussed above.

Figure 4:
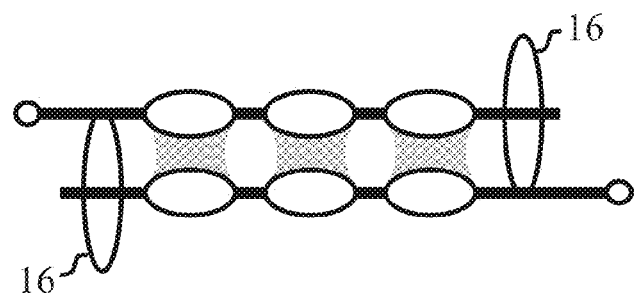
FIG. 4 illustrates a modification to the FIG. 1 embodiment.

The spacers in the above embodiments impart a required degree of rigidity to the molecular component backbone, and the interaction force assists in supporting the composite system. Alternative embodiments may employ additional means of support. An example is illustrated in FIG. 4 as a modification to the component structure of FIG. 1. Here, spacers at the component ends provide an extended backbone, and a molecular ring 16 is attached to each component backbone so as to extend around the other component backbone as indicated. The molecular rings here serve to constrain lateral spacing, providing mechanical stability if the device is not stabilized by the attractive interaction forces. This provides encapsulation in an electronic disturbing environment where the interaction forces are insufficient to "lock" the two components. The molecular rings can also be used to extend the dynamic range of the device beyond the interaction range given by the overlap of the electronic systems or into intermediate situations where the systems do not interact and another "locking" mechanism is required for operation. The device can then be operated in the non-interacting range, where the device is essentially "off".

Figure 5:
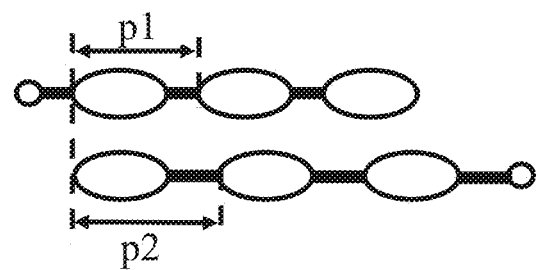
FIG. 5 illustrates another modification to the FIG. 1 embodiment.

Another modification is illustrated in FIG. 5. Here, the systems of the first component are arranged at a first pitch p1 and the systems of the second component are arranged at a greater pitch p2. The different pitch here can be the achieved by appropriate selection of the electronic systems and/or spacers in each case, conveniently by simply selecting spacers of different length for the two components. This feature allows sub-pitch resolution to be achieved in a similar manner to a conventional Vernier scale. Different pairs of systems from respective components will come into alignment with relative movement through different fractions of the inter-system pitch. Distinct changes in the measurement output, occurring at the alignment positions, can be achieved as discussed above, giving sub-pitch resolution in the positional measurement. Following a conventional Vernier scale, for instance, would give a resolution of one-tenth of pitch. In general, the step-size and spacing of such discrete changes can be tailored as desired via appropriate selection of the spacers and/or electronic systems in one or both components. For example, where the spacers interrupt the conjugation between systems as discussed above, then very distinct changes, with discrete plateaus when systems are in alignment, can be achieved, and the length and form of these plateaus can be tailored as desired by modifying the size of the electronic systems with respect to the spacers.

It will be appreciated that, since the size of the sensors described is on the molecular scale, sensitivity on the sub-molecular scale is readily achievable. Positional measurements can therefore be made with Angstrom accuracy, and even sub-Angstrom accuracy where sub-pitch resolution is achieved as discussed above. The sensors can be employed in numerous applications where highly localized sensing and/or extreme sensitivity is required, for example in strain gauges for nanotechnology or molecular-scale devices. Complex electronics is not required for detection, and the apparatus permits ultimate (since defined by molecular bonds) miniaturization, high-density integration and cheap mass-fabrication.

Figure 6A:
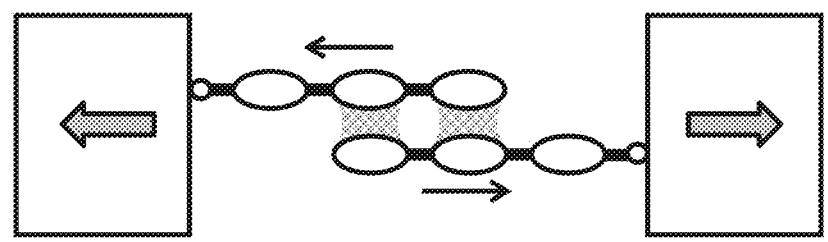
FIGS. 6a and 6b illustrate different operational arrangements for sensor apparatus using a pair of molecular components.
Figure 6B:
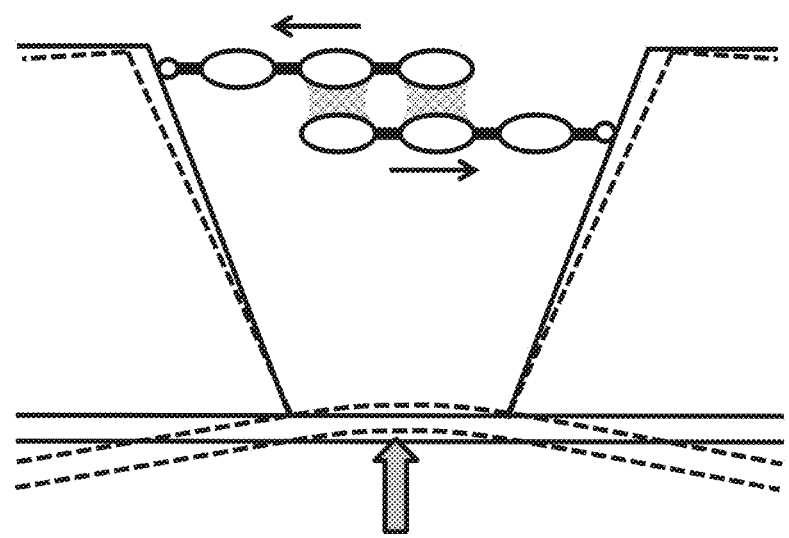

Various sensor implementations can be envisaged using a single pair of molecular components. Of course, while relative displacement of bodies may be measured by the sensor, in many relevant applications a measurement of force is needed. Force can be readily translated into displacement, e.g. using a spring. Such a spring is not necessarily provided via the interaction of the molecular components, e.g. 2a, 2b in FIG. 1, but can be installed separately, e.g. mechanically connecting objects 3a, 3b or objects attached thereto. FIGS. 6a and 6b are schematic illustrations of two exemplary arrangements. In FIG. 6a the applied force (indicated by the shaded arrows) is in the longitudinal direction of the components (the aforementioned spring being omitted here). FIG. 6b shows an arrangement in which operation is effected by transversally-applied force. Here, the spring force is given through bending of the flexible substrate. Compared to the embodiment FIG. 6a, the displacement of interest is reduced here in order to trade dynamic range for sensitivity.

Figure 7A:
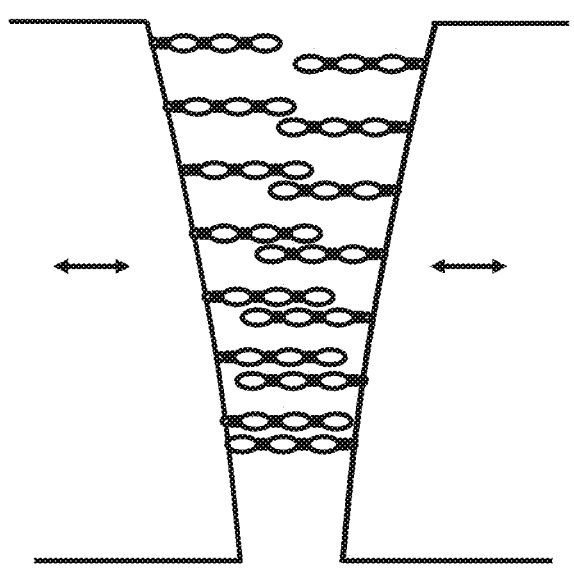
FIGS. 7a and 7b illustrate exemplary arrangements for sensor apparatus using multiple pairs of molecular components.

While such single-pair arrangements are highly sensitive, multiple pairs of molecular components can be employed in some embodiments. One such arrangement is illustrated schematically in FIG. 7a. Here the mechanical displacement to be measured is translated into opening of a gap. Upon opening and closing the gap, the cross-talk between one or more molecular component pairs changes as described above. An electrical detector 7 connected to all component pairs can detect displacement based on the signals from all pairs in combination. This embodiment is easy to fabricate because no accurate initial spacing has to be fabricated and the molecules can be assembled easily using self-assembly techniques well-known in the nanotechnology field.

Figure 7B:
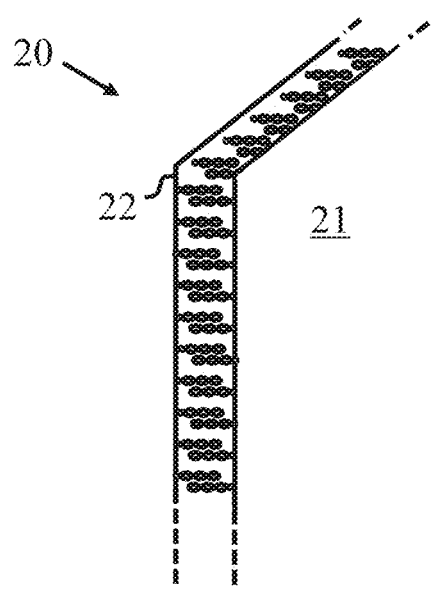

Multi-pair sensor assemblies can be made transparent and flexible, and thus offer a simple and practicable solution for touch screen applications. FIG. 7b indicates structure of such a touch screen display 20. The display has a flexible touch screen 21 extending over a support structure 22. Multiple molecular component pairs like that of FIG. 1 are mounted between the screen 21 and support 22 in the form of an array which extends over the operative area of screen 21. An electrical detector is connected via a two-dimensional electrode array (not shown) to the array of component pairs so as to detect the signal from each pair of components. Each pair of components is thus effectively mounted behind a respective region of the touch screen whereby the interaction between the pair of components varies in response to movement of that region of the screen caused by a user touching the screen. The detector can thus identify areas of the screen which are touched by a user by monitoring the signals from the array of component pairs. For example, touching of predefined spatially distinct, electrically independent areas can be identified by this process.

It will be appreciated that molecular components of numerous designs can be constructed by selection of different electronic systems, spacers and configurations thereof, where electronic systems may in general comprise any systems involving electrons, e.g. free electron systems around atomic sites, and a spacer may comprise e.g. a chemical bond or one or more atoms, ions or molecules in its own right. In the following, particular examples will be described based on molecules produced by chemical synthesis. Due to the nature of the various chemical bonds and elements, atomic distances and spatial arrangements can be controlled on the Angstrom scale. Multiple electronic systems can be created within one single molecule and with a desired pitch or periodicity, whether of equal or unequal distance, linearly increasing distance, double linearly increasing distance, and so on.

Particular examples of molecular components below are based on oligophenylenes. These organic molecules possess molecular orbitals which can extend over more than one atom and form thereby conjugated electronic systems, e.g. extended π electron systems. An example of an electronic system 4, 13 providing a building block for these molecular components is illustrated schematically in FIG. 8. This shows a phenyl (aryl, or benzene) ring providing a conjugated π-system. Spacers can comprise C—C single, double or triple bonds (or combinations thereof) with bond lengths:
  C—C bond: 147 pm=1.47 Å=0.147 nm
  C=C bond: 135 pm=1.35 Å=0.135 nm
  C≡C bond: 120 pm=1.20 Å=0.120 nm As examples of anchoring groups, thiols can be used to attach components to metals and carbon to attach directly to semiconductor surfaces. In a pair of such molecular components (e.g. components 2a, 2b, 10a, 10b) aligned parallel to each other but in opposite polarization, the phenyl systems are self-linking to each other due to the strong attraction of π-π stacking and the rotational symmetry. The delocalized π electron systems on respective components interact such that the electronic interaction leads to intermolecular crosstalk as described above. In embodiments where molecular rings (FIG. 4) are required, passive rings such as rotaxane rings or cyclodextrines can be used with these components.

Figure 9:
FIG. 9 shows one example of a molecular component for use in embodiments of the invention.
Figure 10A:
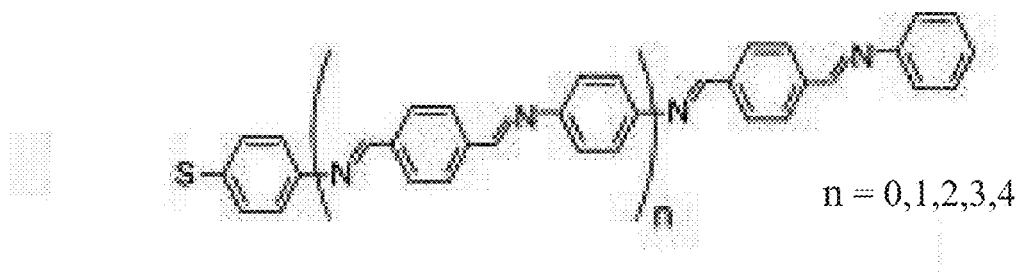
FIGS. 10a and 10b show further examples of molecular components.
Figure 10B:
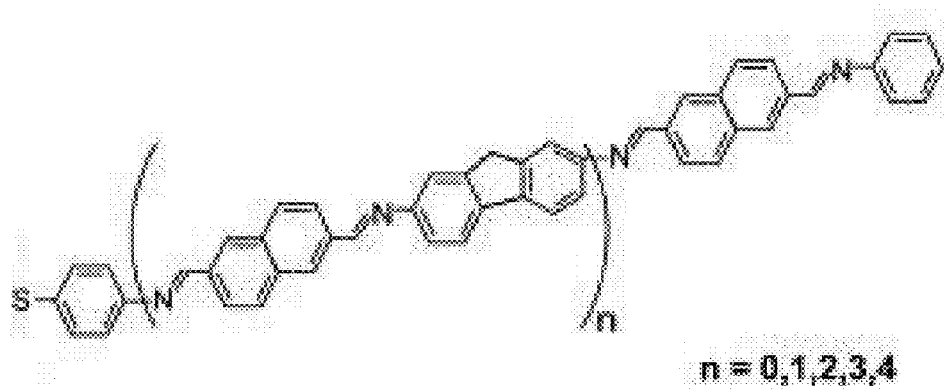

Particular examples of such molecular components are based on so called Tour-wires. One example is illustrated in FIG. 9. This consists of three phenyl rings as respective electronic systems. Adjacent systems are interconnected by spacers formed by a suitable sequence of single-triple-single carbon bonds, with sulfur providing the anchor. Similar examples employing different spacers and variable pitch are illustrated in FIGS. 10a and 10b.

Figure 11A:
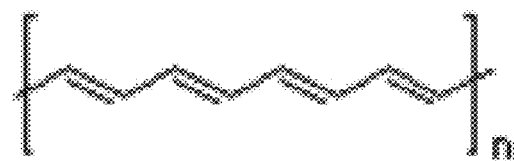
FIGS. 11a and 11b show examples of spacers for use in molecular components.
Figure 11B:
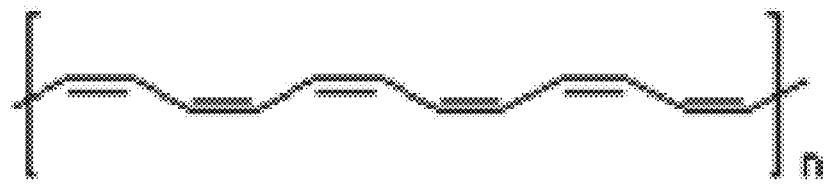

The molecular component of FIG. 9 provides an implementation for components 10a, 10b of FIG. 3 where the conjugation extends over the entire molecule. Spacers can of course be selected to break the conjugation as, for example, in components 2a, 2b of FIG. 1. Particular examples of such spacers, based on polyacetylenes, are illustrated in FIGS. 11a and 11b.

Figure 12A:
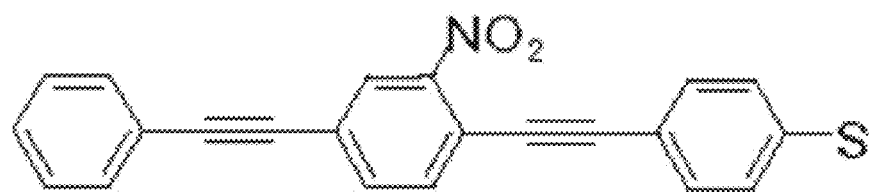
FIGS. 12a and 12b show respective modifications to the molecular component of FIG. 9.
Figure 12B:
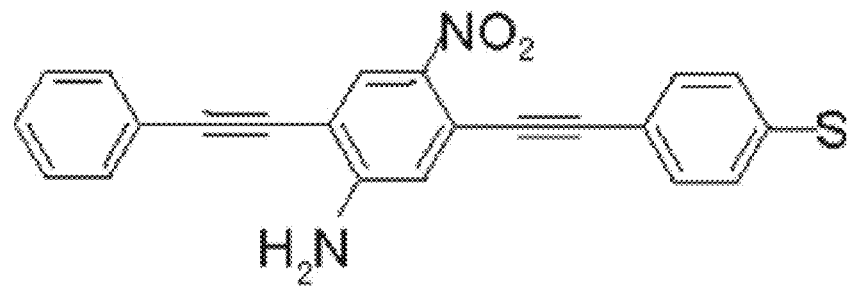

FIGS. 12a and 12b show further examples of molecular components. With these components, side groups are used to promote the specific electronic interaction between components. The side group $NO_2$ is used in FIG. 12a to increase the dipole moment of the central electronic system due to its electron-withdrawing property. The interaction is extended spatially in FIG. 12b through addition of side group $H_2N$ which further enhances the dipole moment. Examples of other useful side groups include: —NO, —$NO_2$, Ketones (=O), hydroxyl groups (—OH), phosphate (as in DNA), or charged and redox-active entities like metal complexes.

Figure 8:
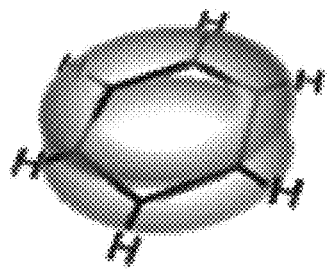
FIG. 8 shows one example of an electronic system for use in embodiments of the invention.
Figure 13:
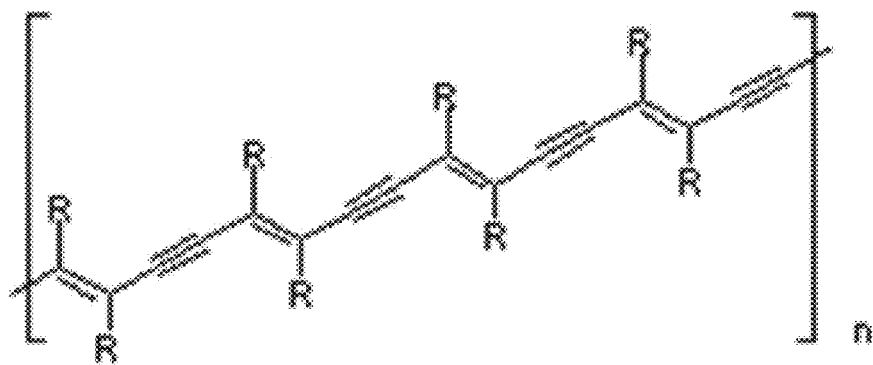
FIG. 13 illustrates an exemplary structure for a two-dimensional molecular component.
Figure 14:
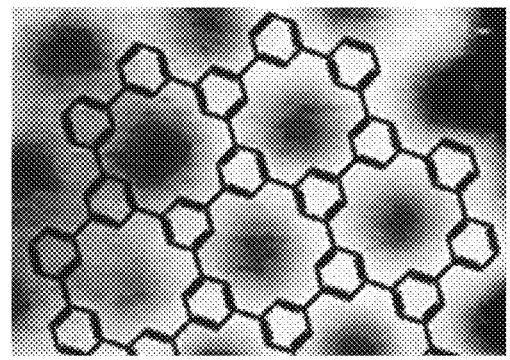
FIG. 14 indicates the basic structure of another two-dimensional molecular component.
Figure 15:
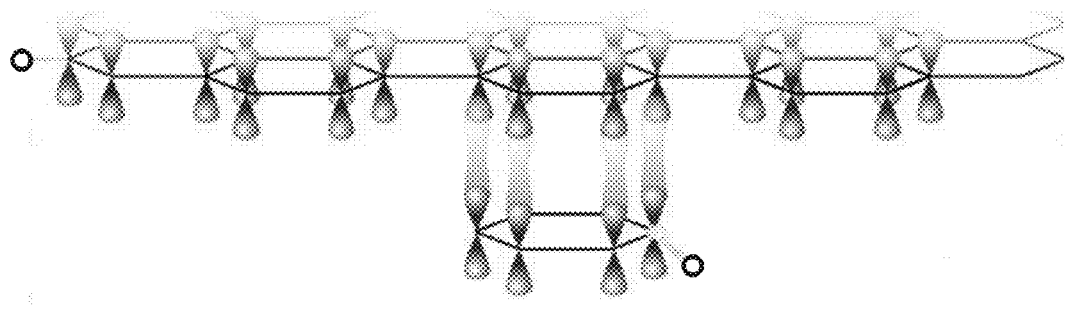
FIGS. 15 and 16 illustrate different implementations for sensor apparatus using the component structure of FIG. 14.
Figure 16:
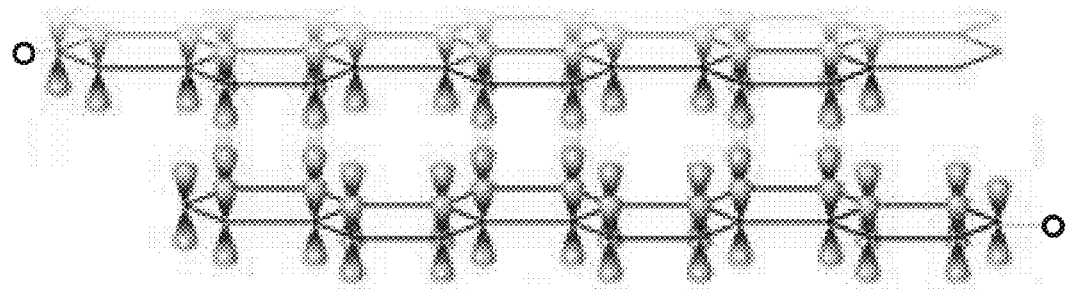

While components in the form of generally linear arrays are described above, two- or even three-dimensional components can be envisaged too. FIG. 13 shows an exemplary configuration for an elongate two-dimensional component. "R" here represents one or several electronic systems such as those described above, arranged with a linear periodicity of the interaction sites. In general, one or both of the molecular components may comprise a two-dimensional network of electronic systems. A particular example here is a graphene sheet or nanoribbon. FIG. 14 illustrates the basic structure of graphene as a regular hexagonal array of interconnected phenyl rings as shown in FIG. 8. Configuration of an exemplary sensor using graphene-based molecular components is indicated in FIG. 15, where the interaction sites (phenyl rings) are represented for simplicity as vertices of the hexagonal network. In this example, one component is formed by a single hexagonal unit and the other by a sheet of such units. An alternative embodiment is shown in FIG. 16 where the lower component is formed by an elongate nanoribbon. In these embodiments, fabrication issues move from placement of individual molecules to lithographic structuring of graphene electrodes. Such networks may of course be formed in various ways into three-dimensional components, e.g. by folding or bending.

Figure 17:
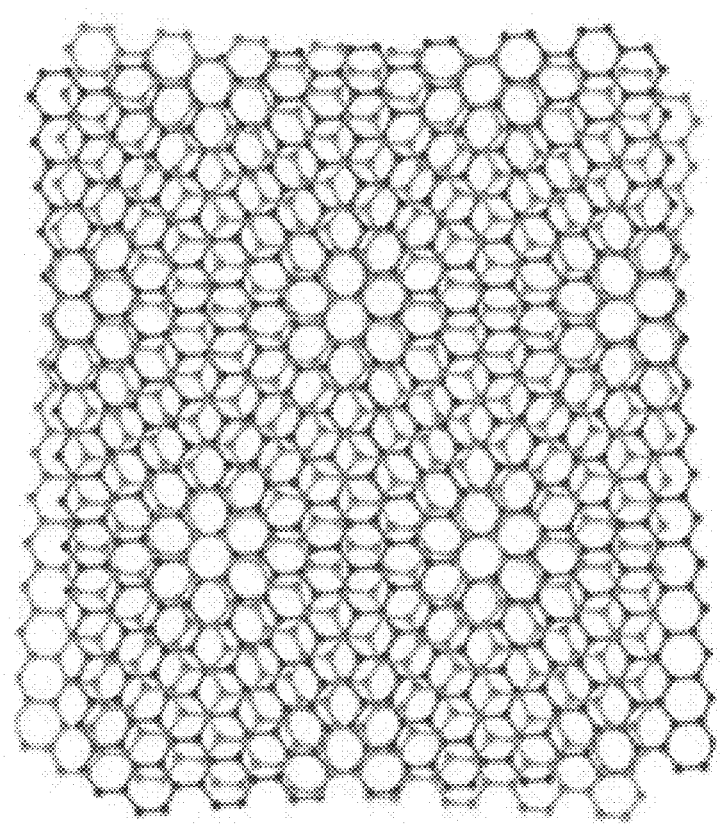
FIG. 17 illustrates a modification to the arrangement of FIG. 16.

In the FIG. 15 arrangement, a periodic signal with respect to displacement is expected. The measurement of absolute displacements therefore requires tracking of the signal similar to interferometry displacement sensing. This embodiment, however, combines high resolution with a large dynamic range. In the FIG. 16 embodiment, or similar arrangements using two-dimensional networks of like electronic systems with like network arrangements, the components can be arranged substantially in parallel but with a rotational offset between the networks as illustrated schematically in FIG. 17. The interaction then leads to a more complex pattern of interacting sites and permits sub-pitch resolution (e.g. Vernier-like operation) to be achieved as discussed above.

While the above focuses on electronic interaction between components as the basis for sensor operation, in principle any molecular force could be exploited to provide the required interaction. On or more of the following forces (given here in decreasing strength order) may therefore be exploited in embodiments of the invention: ionic exchange forces; hydrogen bridges; dipole forces; and Van-der-Waals forces. The $\pi$-$\pi$ stacking interaction described above is based on quadrupole momentum effects and is generally speaking a dipole force. It reaches 50 kJ/mol binding force and so is sufficiently strong to create large effects but is not too strong so as still to allow mechanical motion. Molecules with dipole moments are considered particularly advantageous as building blocks for embodiments of the invention. Linear dipoles may be used in some embodiments to provide additional tunability over aromatic systems due to rotational effects enforcing the cross-talk. However, any of the forces given above may be exploited in different embodiments. Van-der-Waals forces, for example, are particularly feasible for electrical detection embodiments based on multiple interacting component pairs.

Various other alternatives and modifications can be envisaged. For example, the structure and/or arrangement of the two molecular components in an interacting pair may differ in various ways. Anchor points for components may be provided directly by spacers in some embodiments. Other electrical and optical properties of interacting components might also be employed as the basis for detection. In embodiments where the interaction affects both an electrical and optical property of the components, the detector may be adapted to detect each of these properties. Optical detection, for instance, might be used in a first detection stage to determine an appropriate probing current for a second, more accurate stage of electrical detection.

It will be appreciated that many further changes and modifications can be made to the exemplary embodiments described without departing from the scope of the invention.

What is claimed is:

1. A sensor apparatus for sensing relative position of two objects, the apparatus comprising:
a first molecular component comprising a plurality of electronic systems, wherein the first molecular component is connected to a first object;
a second molecular component comprising a plurality of electronic systems, wherein the second molecular component is connected to a second object;
wherein the first and second components are arranged in mutual proximity, such that an interaction between the electronic systems of the first and second molecular components varies with relative position of the first and second objects, said interaction affecting an electrical or optical property of the first and second molecular components;
a detector for detecting said property to produce an output dependent on relative position of the first and second objects;
at least one first spacer directly connected to two adjacent electronic systems of the plurality of electronic systems of the first molecular component, for interconnecting and electrically coupling said two adjacent electronic systems;
at least one second spacer directly connected to two adjacent electronic systems of the plurality of electronic systems of the second molecular component for interconnecting and electrically coupling said two adjacent electronic systems; and
wherein the at least one first spacer and the at least one second spacer are arranged, such that the electronic systems of the first and second molecular components interact at different relative positions of the first and second objects to cause step-like changes in said property with relative position of the first and second objects, wherein the detector is adapted to detect said step-like changes to produce said output.

2. The apparatus as claimed in claim 1, wherein said first and second spacers are adapted to permit electronic conjugation of the adjacent systems.

3. The apparatus as claimed in claim 1, wherein said first and second spacers are adapted to inhibit electronic conjugation of the adjacent systems.

4. The apparatus as claimed in claim 1, wherein said plurality of electronic systems of the first and second molecular components are arranged to form elongate components, and wherein said objects are relatively movable to effect relative movement of the elongate components in a direction along the length of the components.

5. The apparatus as claimed in claim 4, wherein said plurality of electronic systems of the first and second molecular components comprise a linear array of said systems.

6. The apparatus as claimed in claim 4, wherein the first and second elongate components are arranged laterally of one another.

7. The apparatus as claimed in claim 6, further comprising at least one molecular ring attached to one component and extending around the other component to constrain lateral spacing of the components.

8. The apparatus as claimed in claim 1, wherein the electronic systems of the first component are arranged at a first pitch and the electronic systems of the second component are arranged at a second, different pitch.

9. The apparatus as claimed in claim 1, wherein at least one of the components comprises a two-dimensional network of electronic systems.

10. The apparatus as claimed in claim 1, wherein the first and second components comprise respective two-dimensional networks of like electronic systems with like network arrangements, the components being arranged in parallel with a rotational offset between the networks.

11. The apparatus as claimed in claim 1, wherein said interaction affects both an electrical and optical property of the components, and wherein the detector is adapted to detect each property to produce said output.

12. The apparatus as claimed in claim 1, wherein said interaction affects at least one of electrical resistance and optical absorption.

13. The apparatus as claimed in claim 1, wherein said interaction comprises at least one of an ionic exchange force, hydrogen bridge force, dipole force and Van der Waals force.

14. The apparatus as claimed in claim 1, further comprising a plurality of pairs of the first and second molecular components, wherein the detector is adapted to detect said property of each pair of components to produce said output.

15. The apparatus as claimed in claim 1, further comprising a touch screen display;
- the touch screen display comprising a flexible touch screen extending over a support structure; and
- wherein the first and second molecular components are mounted between the support structure and a respective region of the touch screen such that said interaction between the pair of components varies in response to movement of that region of the screen caused by touching.

* * * * *